United States Patent [19]

Downer et al.

[11] Patent Number: 4,961,352
[45] Date of Patent: Oct. 9, 1990

[54] MAGNETIC BEARING AND SUSPENSION SYSTEM

[75] Inventors: James R. Downer, Canton; David B. Eisenhaure, Hull; Richard L. Hockney, Lynnfield; Bruce G. Johnson, Nahant, all of Mass.

[73] Assignee: SatCon Technology Corporation, Cambridge, Mass.

[21] Appl. No.: 159,844

[22] Filed: Feb. 24, 1988

[51] Int. Cl.⁵ .................... G01C 19/08; G01C 19/24
[52] U.S. Cl. ........................ 74/5.46; 74/5.7; 310/90.5
[58] Field of Search ............. 74/5.7, 5.46, 5.6 E; 310/90.5; 505/870, 879

[56] References Cited

U.S. PATENT DOCUMENTS

| | | | |
|---|---|---|---|
| 3,105,657 | 10/1963 | Mueller et al. | 74/5.7 X |
| 3,295,379 | 1/1967 | Jensen et al. | 74/5.7 X |
| 3,535,941 | 10/1970 | Fowler et al. | 74/5.7 X |
| 3,763,708 | 10/1973 | Angele | 74/5.7 |
| 3,845,995 | 11/1974 | Wehde | 310/90.5 |
| 3,924,176 | 12/1975 | Fletcher et al. | 324/248 |
| 4,441,375 | 4/1984 | Minohara et al. | 74/5.46 |
| 4,611,863 | 9/1986 | Isely | 310/90.5 |

Primary Examiner—Rodney H. Bonck
Attorney, Agent, or Firm—Joseph S. Iandiorio

[57] ABSTRACT

A magnetic rotor suspension system including a magnetic rotor having a spin axis, and a generally spherical housing spaced from the rotor. The system includes means attached to the housing for applying magnetic fields to the rotor to fix its lateral and axial position relative to the housing and to adjust the angular orientation of the spin axis of the rotor relative to the housing.

25 Claims, 15 Drawing Sheets

MAGNETIC BEARING AND SUSPENSION SYSTEM

FIELD OF INVENTION

This invention relates to a magnetic bearing and suspension system that can be gimballed about 360 degrees and is useful as a magnetic bearing for high force/high torque applications.

BACKGROUND OF INVENTION

The attitude or angular orientation of a satellite or other spacecraft may be controlled by exchanging angular momentum between the craft and an array of control moment gyros (CMGs). The CMGs must have extremely low torque jitter which is an extremely difficult design constraint for mechanical bearings. A primary cause of torque jitter in existing CMGs is that mechanical bearings, because of direct contact between the rotating and stationary elements, transmit vibrations arising from rotor unbalance to the supporting structure.

The use of magnetic bearings in CMGs has the primary advantage that physical contact between the rotor and stator is eliminated. Vibration and structural interaction can be reduced through the use of active control. Magnetic bearings have been demonstrated for use in CMGs for "small" satellites. The word "small" refers to the magnitude of the torques which must be applied to the spacecraft (up to several hundred Newton-meters). For "large" spacecraft (those which require torques as large as several tens of thousands of Newton-meters), flux saturation in conventional core materials requires either that a large, heavy magnetic structure be employed, or that the magnetic solenoid consume a great deal of electrical power. Either alternative is undesirable in a spacecraft. In addition, magnetic bearings typically gimbal the flywheel about a relatively small angle of only 10–20 degrees, which limits the amount of angular momentum transferable between the flywheel and the spacecraft.

SUMMARY OF INVENTION

It is therefore an object of this invention to provide a magnetic bearing and suspension system which can be gimballed about 360 degrees.

It is a further object of this invention to provide a magnetic suspension system which is relatively small and has a low power consumption.

It is a further object of this invention to provide a magnetic gyroscope system which is useful for large spacecraft.

This invention results from the realization that magnetic bearing and suspension systems may be improved considerably by employing a spherical housing which allows the rotor to be gimballed about 360 degrees and further by employing a superconducting magnetic solenoid which has a high magnetic flux density but is relatively light and consumes little power.

This invention features a magnetic rotor suspension system which includes a magnetic rotor having a spin axis and a generally spherical housing spaced from the rotor. There are means attached to the housing for applying a magnetic field to the rotor to fix its lateral position relative to the housing. There are also means attached to the housing for applying a magnetic field to the rotor to fix its axial position relative to the housing. Finally, the suspension system includes means attached to the housing for applying a magnetic field to the rotor to adjust the angular orientation of the spin axis of the rotor relative to the housing. The rotor preferably includes a superconducting solenoid. A magnetic bearing system includes means for fixing the angular orientation of the spin axis of the rotor rather than adjusting it. The superconducting suspension and bearing systems include a housing spaced from the solenoid solenoid and preferably surrounding it.

A magnetic gyroscope system according to this invention includes a rotor with an annular magnet having a spin axis and a flywheel fixed to the magnet having a spherical contour. There is an armature for inducing rotation of the rotor to store angular momentum, and a generally spherical housing spaced from the rotor. The gyroscope system further includes means attached to the housing for applying magnetic fields to the rotor to fix its lateral and axial position and adjust the angular orientation of the spin axis of the rotor relative to the housing. This adjustment transfers momentum between the housing and rotor to control the relative positions of the housing and the rotor. The magnet preferably includes a superconducting solenoid. Typically, the magnetic fields are applied to the rotor with one or more control coils for conducting current flow to create the magnetic fields to fix the lateral and axial position of the rotor and either fix or adjust the angular orientation of the spin axis of the rotor relative to the housing. Preferably, there area plurality of pairs of coils to fix and adjust the position of the rotor.

The gyroscope system also preferably includes means for monitoring the lateral and axial position of the rotor relative to the housing, and means for determining the relative positions of the spin axis of the rotor and the housing. By further including means, responsive to the means for determining the relative positions of the spin axis of the rotor and the housing, for selectively exciting the control coils, the relative position of the spin axis and the housing can be altered as desired.

Preferably, the armature of the system is fixed to the housing. The armature may be located inside of the housing or, alternatively, outside the housing to allow a full 360 degree rotation of the rotor within the housing. The housing typically surrounds the rotor. The system preferably further includes means for maintaining the superconducting solenoid at no greater than its superconducting critical temperature. The rotor preferably has a spherical contour to provide a constant gap width between the rotor and the housing regardless of the rotor position.

In a preferred embodiment, the position of the rotor is controlled by including a plurality of pairs of coils attached to the housing. Typically, there is at least one pair for maintaining the lateral position of the rotor in two mutually perpendicular directions, at least one pair for maintaining the axial position of the rotor and at least one pair for maintaining or adjusting the relative position of the spin axis of the rotor and the housing. Rotor control can be accomplished with as few as four pairs of coils, but providing six pairs of coils for accomplishing the fixing and 360 degree gimballing is preferred.

DISCLOSURE OF PREFERRED EMBODIMENT

Other objects, features and advantages will occur from the following description of a preferred embodiment and the accompanying drawings, in which:

FIG. 7A is a more detailed schematic of the optical sensor circuit of FIG. 6a;

FIG. 8 is a schematic of the center-of-mass position determining circuit of FIG. 6a;

The invention may be accomplished by a magnetic rotor suspension system that selectively excites control coils on a spherical housing to fix the lateral and axial position of a magnetic rotor and fix or adjust the angular orientation of the spin axis of the rotor relative to the housing. The magnet may include a superconducting magnetic solenoid which is kept at or below its superconducting critical temperature so it operates in the persistent current mode and does not require a large current source.

Figure 1A:
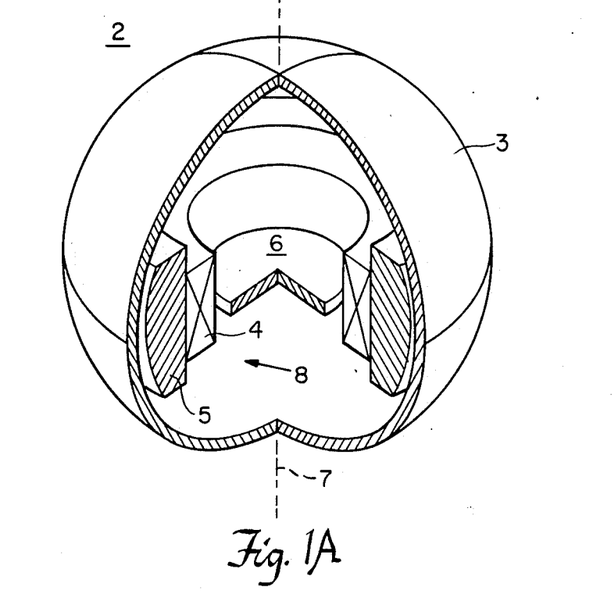
FIG. 1A is a diagrammatic, cross-sectional view of a magnetic bearing and suspension system according to this invention.

There is shown in FIG. 1A a magnetic bearing/suspension system 2. The system has fixed stator 6 and rotor 8 spaced from stator 6 and having spin axis 7 shown in dashed line. Rotor 8 includes annular magnet 4 and flywheel 5 attached to magnet 4. Flywheel 5 is machined to a spherical shape to provide a constant gap width between it and spherical housing 3. Rotor 8 is rotated about axis 7 by stator 6, and is gimballed by a number of control coils attached to housing 3 as described below. For use as a bearing, the angular orientation of spin axis 7 of rotor 8 is fixed. Because housing 3 is spherical and surrounds rotor 8, the rotor's movement within housing 3 is limited only by the presence of stator 6. By moving stator 6 outside of housing 3 as described below, rotor 8 may be gimballed about 360 degrees, which provides the maximum possible momentum transfer between rotor 8 and housing 3.

Figure 1B:
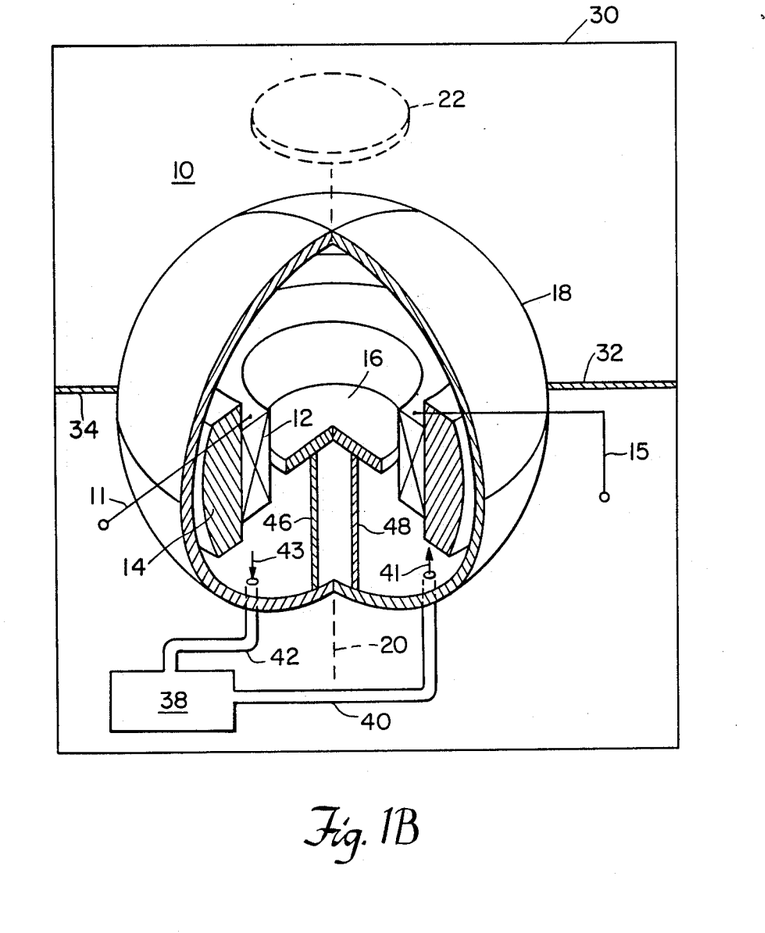
FIG. 1B is a diagrammatic cross-sectional view of a superconducting magnetic gyroscope system according to this invention.

FIG. 1B depicts a superconducting magnetic gyroscope system 10 having fixed stator or armature 16 attached to spherical housing 18 by members 46 and 48. Stator 16 is surrounded by and spaced from superconducting magnetic solenoid 12 with flywheel 14 attached to its outer side. Solenoid 12 replaces the large, heavy magnets required in conventional magnetic bearings. Flywheel 14[is preferably a graphite/epoxy composite flywheel that stores angular momentum as solenoid 12 is turned. The outer surface of flywheel 14 is machined to have a spherical contour so the gap between flywheel 14 and spherical housing 18 is constant. Flywheel 14 can be a spherical section as shown, or alternatively could be a full sphere. Housing 18 is fixed to structure 30, which may be a spacecraft, by members 32 and 34.

Solenoid 12 is a coil of superconducting wire and is kept at or below its superconducting critical temperature by cooling device 38 which may be a refrigeration circuit which supplies liquid helium to the interior of sealed housing 18 through pipe 40 as shown by arrow 41, and collects gaseous helium through pipe 42 as shown by arrow 43. When kept at or below its superconducting critical temperature, solenoid 12 will carry a large amount of current in the persistent current mode, that is with an immeasurable resistance. As a result, current can be injected into solenoid 12 through leads 15 and 11 and will persist virtually unchanged when leads 15 and 11 are connected. This greatly decreases the overall power requirement of system 10. In addition, the high current creates a larger magnetic flux than would a conventional magnet of the same size and/or weight.

Figure 2:
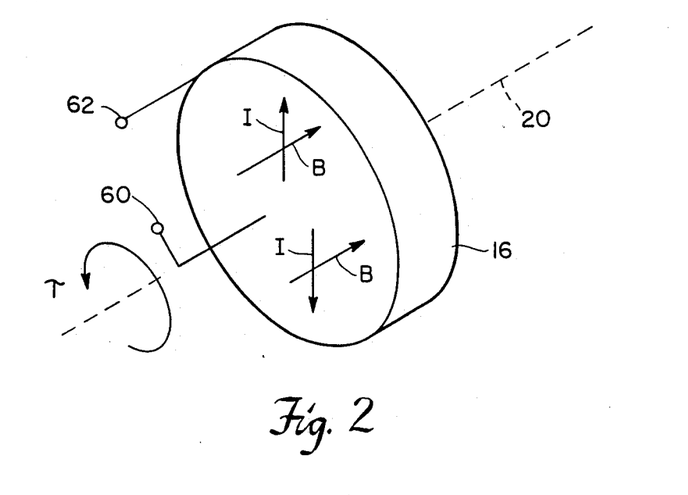
FIG. 2 is an axonometric view of the armature of FIG. 1B.

Stator 16 is shown in more detail in FIG. 2. Radial currents I are excited in the stator by passing current in lead 60 and out lead 62. Axial flux indicated by arrows B is produced by solenoid 12. Since stator 16 is fixed, the interaction of radial current I and flux B applies torque about spin axis 20 of solenoid 12. Torque is applied to solenoid 12 and flywheel 14 until they reach their operating speed of up to 1000 rpm. Drag losses due to friction with the liquid helium within housing 18 are relatively small, so the motor need not operate continuously in order to maintain the nearly constant rotational speed required in a gyroscope system. This factor also contributes to the decreased power requirements of system 10. To provide a gyroscope in which the flywheel can be completely gimballed within housing 18, stator 22, shown in phantom in FIG. 1B, can alternatively be located outside of housing 18.

Figure 3A:
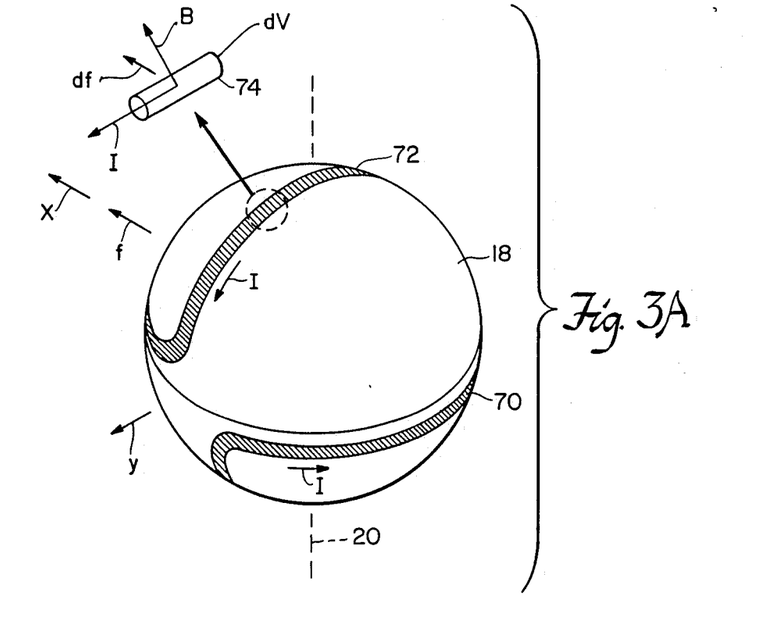
FIG. 3A and 3B are schematic representations of the control coils for fixing the lateral position of the rotor of FIG. 1B.
Figure 3B:
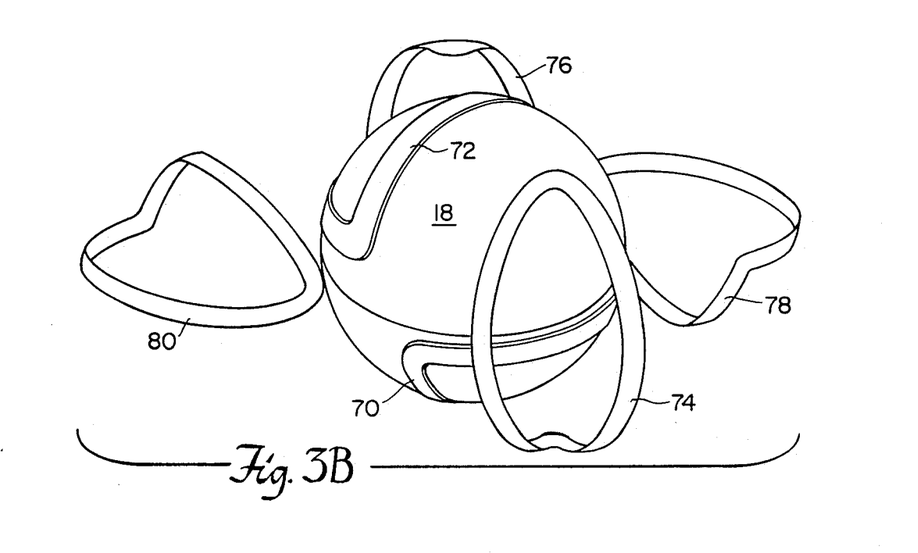

The mechanism for applying radial forces to solenoid 12 is shown in FIGS. 3A and 3B. Coil 72 and 70 are attached to the outer surface of housing 18 and conduct current in the directions shown by arrows I. A single differential section dV, 74, of coil 72, is shown carrying current I. Magnetic field B produced by solenoid 12 interacts with current I to produce a differential force df in the direction shown. The net force f produced by coils 72 and 70 is perpendicular to spin axis 20. Two additional pairs of coils 74 and 76, and 78 and 80 are added for radial control in the Y and Z axis. With spin axis 20 defined as the Z axis, coils 78 and 80 produce radial force along the Y axis and coils 74 and 76 produce radial force along the Z axis. Since solenoid 12 is gimballed, these three sets of coils provide the radial force necessary to fix the lateral position of solenoid 12 and flywheel 14 as they rotate relative to housing 18.

Figure 4A:
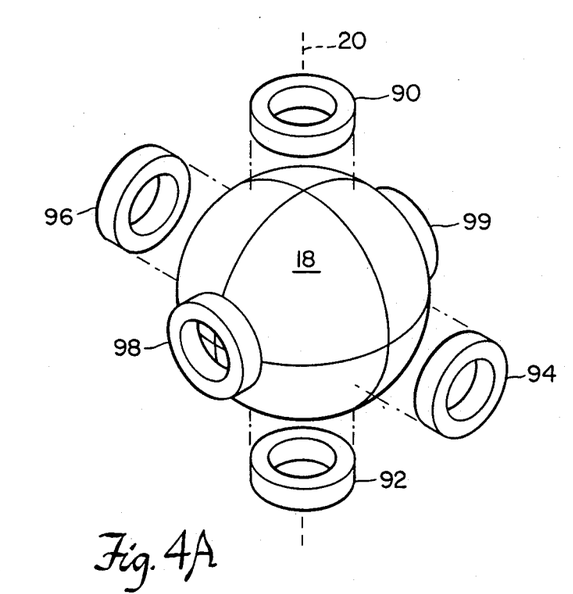
FIGS. 4A through 4C are schematic representations of the control coils for fixing the axial position of the rotor and fixing or adjusting the relative positions of the spin axis of the rotor and the housing of the system of FIG. 1B
Figure 4B:
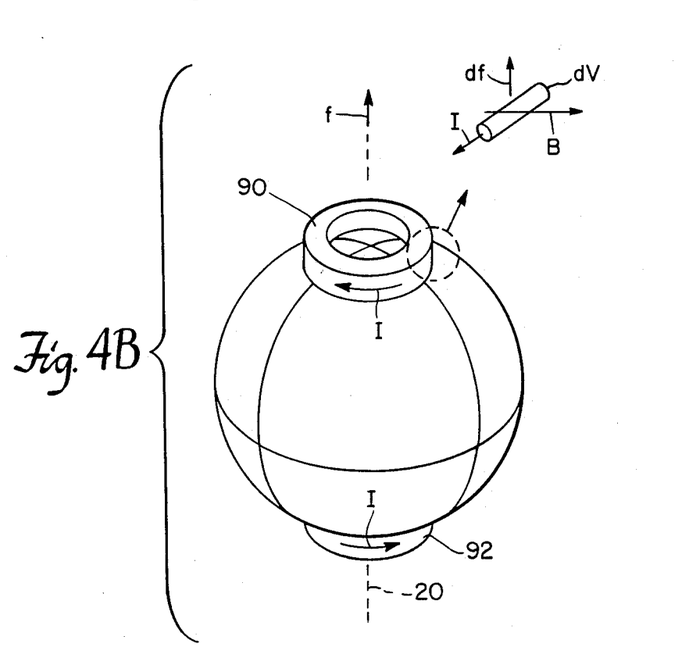

Six additional control coils for applying axial forces to fix the axial position of solenoid 12 and apply torques to solenoid 12 are shown in FIG. 4A. Coil pairs 90 and 92, 94 and 96, and 98 and 99 are attached to housing 18 along with the three sets of coils shown in FIG. 3B. Coil pair 90 and 92, FIG. 4B, are located along spin axis 20 and together produce force f along the spin axis as shown by differential section dV. The interaction between current I and magnetic field B from solenoid 12 produce a differential force df on the solenoid. The net result of this interaction is a force f which acts along the Z axis as shown.

Figure 4C:
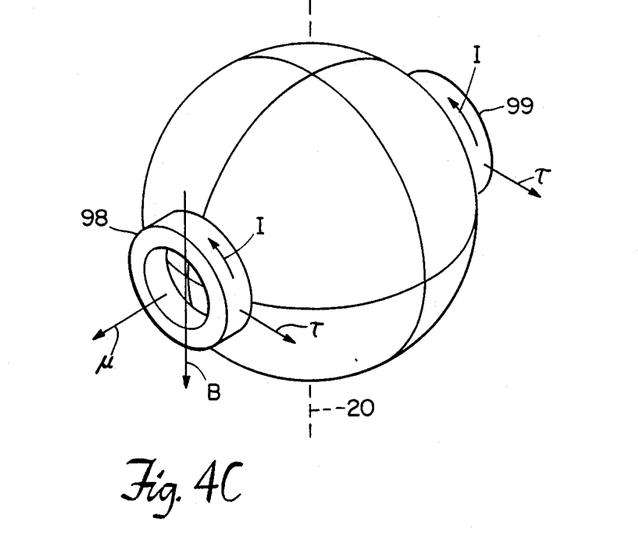

The coils shown in FIG. 4A which are not coaxial with spin axis 20 are used to apply torques to solenoid 12 and flywheel 14. The torquing mechanism is shown in FIG. 4C. Coil pair 98 and 99 carry current in the direction I which interacts with the magnetic field in direction B. This example again assumes that the spin axis is axis 20. The torque $\tau$ results from the interaction o dipole moment $\mu$ produced from the current I in coil 98 and magnetic field B.

By providing the three sets of coils shown in FIG. 4A, axial forces can be applied along the spin axis of the rotor regardless of its position. These same sets of coils also apply the torque to the flywheel to control its precession and nutation angles. Since housing 18 is fixed to spacecraft 30, the change in the orientation of the spin axis of solenoid 12 and housing 18 produces an opposite change to the position of spacecraft 30 due to conservation of momentum. By providing a gyroscope in which the flywheel can be completely gimballed without contact with the housing, the spin axis of the flywheel can be placed as desired to properly turn the spacecraft.

Control of the position of the solenoid and flywheel is accomplished with an array of proximity detectors and a control system which provides current to the control coils as required to fix the lateral and axial position of the rotor and either fix or adjust the angular orientation of the spin axis of the rotor relative to the housing.

Figure 5:
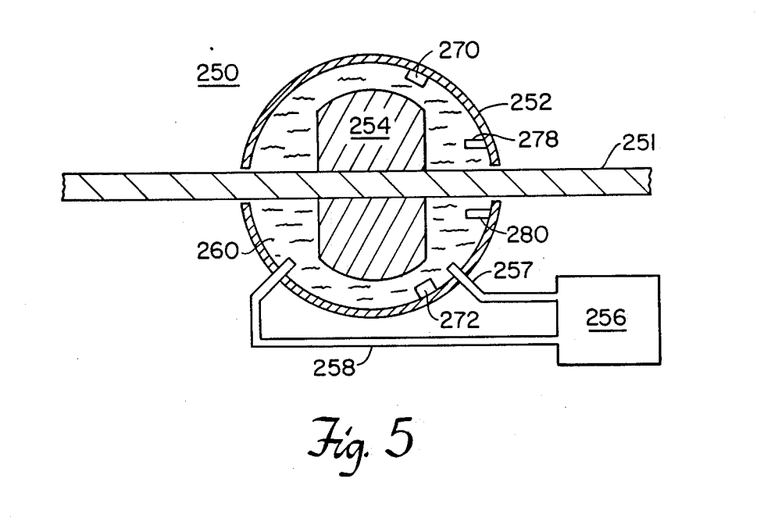
FIG. 5 is a schematic, cross-sectional view of a superconducting magnetic rotor suspension and bearing system according to this invention.

An example of a detection system is shown in FIG. 5. Four optical position sensors, two of which 270 and 272 are shown, are spaced at 90 degree intervals around the inside of housing 252. These optical position sensors include a light source and a detector. The light impinges on the spherical surface of rotor 254 and the intensity of the reflected light received by the detector is related to the distance between the detector and the surface of the rotor. Four[rotational displacement sensors, two of which 278 and 280 are shown, are also spaced at 90 degree intervals around the inside of housing 252. The rotational displacement sensors are preferably also optical sensors which measure the rotation of rotor 254 about the X and Y axis. FIG. 5 also depicts a magnetic rotor suspension or bearing system in which superconducting magnetic rotor 254 is attached to machine shaft 251. Control coils such as those shown in FIGS. 1 through 4 are attached to housing 252 as described above to keep the lateral and axial position of rotor 254 fixed and also to fix or adjust the angular orientation of the spin axis of rotor 254 to hold rotating shaft 251 in place as required. Refrigeration unit 256 supplies liquid helium 260 at or below the superconducting critical temperature of rotor 254 through pipe 257, and the gaseous helium is returned through pipe 258 and cooled by unit 256 to keep the rotor at the proper operating temperature.

Figure 6A:
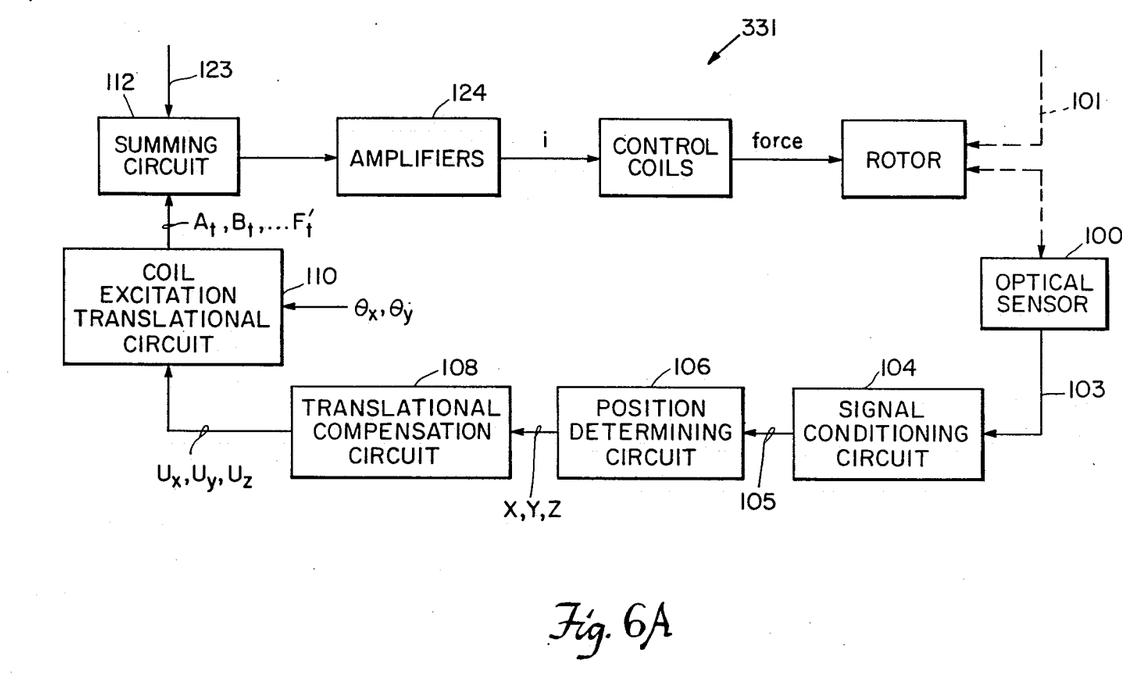
FIGS. 6A and 6B are schematic block diagrams of the circuits for controlling the position of the rotor through selective excitation of the control coils.

The control circuit for the superconducting magnetic rotor suspension system is shown in FIGS. 6A through 14. Selective excitation circuit 331 for controlling the corrective forces and torques to the rotor is depicted in FIGS. 6A and 6B. The orientation of rotor 254 is monitored by optical sensors 100, FIG. 6A, and 102, FIG. 6B.

Optical sensors 100, FIG. 6A, including sensors 270 and 272, FIG. 5, determine the gap width between rotor 254 and the fiber optic sensors. The sensors are distributed at four points such as at 0 degrees, 90 degrees, 180 degrees and 270 degrees. The four gap width signals 103 are submitted from optical sensors 100 to optical sensor signal conditioning circuit 104, FIG. 6A. Signal conditioning circuit 104 processes the gap width signals and submits normalized gap width signals 105 to center-of-mass position determining circuit 106. Position determining circuit 106 utilizes the four normalized gap error signals 105 to obtain three displacement signals in the X, Y, Z, coordinate system. The displacement signals X, Y, Z are provided to translational compensation circuit 108 which processes the three displacement signals into three force correction commands $U_X$, $U_Y$, and $U_Z$. These three force correction commands are submitted to coil excitation translational circuit 110. Corrective commands for each of the 12 coils $A_t$, $B_t$, $C_t$, $D_t$, $E_t$, $F_t$, $A_{t'}$, $B_{t'}$, $C_{t'}$, $D_{t'}$, $E_{t'}$, and $F_{t'}$, are submitted to summing circuit 112 as described below.

Sensors 102, including sensors 278 and 280, FIG. 5, are also distributed at four points around the rotating portion of rotor 254. Four gap width signals such as at 0 degrees, 90 degrees, 180 degrees and 270 degrees are obtained, dashed line 101, and are submitted to sensor signal conditioning circuit 114, FIG. 6B. Circuit 114 produces four gap width deviation signals 115 which are submitted to rotor angle determining circuit 116. Determining circuit 116 provides two outputs, theta$_X$ and theta$_Y$ representing the rotor angles around the X and Y axes. These signals are negated and submitted to summing circuit 118 where they are each combined with rotor angle set point commands 117, 119, respectively, which are provided as external inputs. Rotor angle error signals $e_X$ and $e_Y$ are submitted to rotational compensation circuit 120 which produces torque correction commands $U_X$ and $U_Y$. These two torque correction commands are received by coil excitation rotational circuit 122 where correction commands $A_r$, $B_r$, $C_r$, $D_r$, $E_r$, $F_r$, $A_{r'}$, $B_{r'}$, $C_{4'}$, $D_{r'}$, $E_{r'}$, $F_{r'}$ are produced. The rotational commands are submitted, line 123, to summing circuit 112, FIG. 6A, where they are combined with the twelve coil excitation commands, $A_t$, $B_t$....$F_{t'}$, from circuit 110. Each of the twelve net coil excitation commands A,B, ....F', is submitted to an amplifier in amplifying circuit 124. Amplifier circuit 124 produces twelve current signals i which are submitted to the twelve control coils located on housing 252. Positive current from circuit 124 produces a force vector in one direction for a particular coil while a negative current produces a force in the opposite direction. Forces are thereby exerted on rotor 254.

Figure 7A:
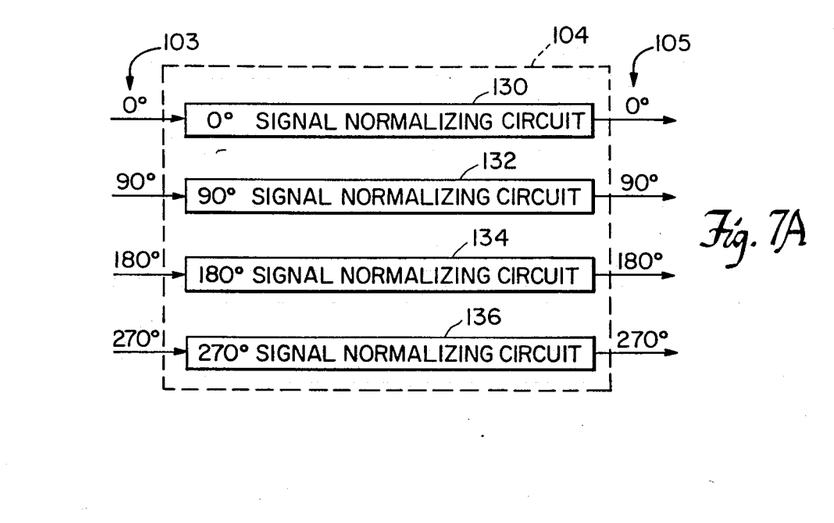
Figure 7B:
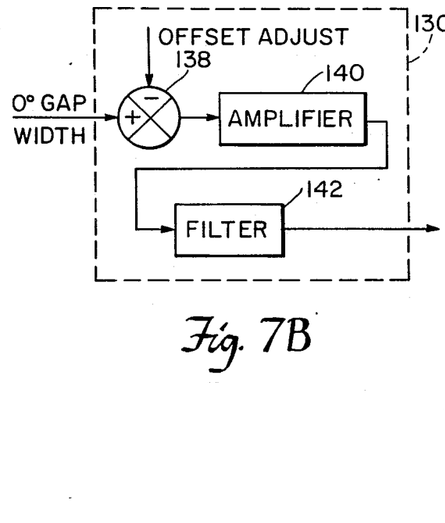
FIG. 7B is a more detailed schematic of one of the signal normalizing circuits of FIG. 7A.

Optical sensor signal containing circuit 104 is presented in greater detail in Figs 7A and 7B. Signal normalizing circuits 130, 132, 134, 136 process gap width values 103 at 0 degrees, 90 degrees, 180 degrees, and 270 degrees, respectively, to produce four normalized optical sensor gap width signals 105.

Signal normalizing circuit 130 is presented in more detail in FIG. 7B where the 0 degree gap width signal is provided to summer 138 and variable gain amplifier 140. Summer 138 combines an empirically determined offset adjust signal with the gap width signal; summer 138 and amplifier 140 serve to normalize individual optical sensors to compensate for manufacturing inconsistencies among the optical sensors. The corrected gap width signal, normalized to the other sensors, then passes through low pass filter 142.

Figure 8:
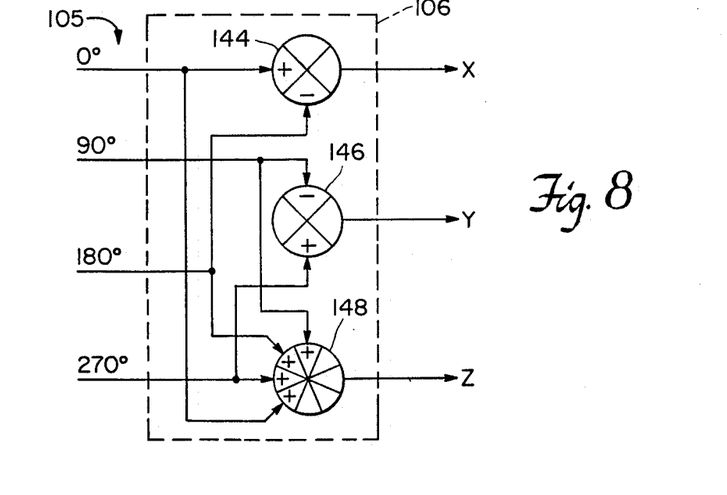

Center-of-mass position determining circuit 106, FIG. 8, combines normalized gap width signals 105 at 0 degrees and 180 degrees in summer 144 to produce displacement signal X, and combines the 90 degree and 270 degree normalized gap width signals in summer 146 to provide displacement signal Y. All four normalized signals are combined in summer 148 to provide displacement signal Z.

Figure 9A:
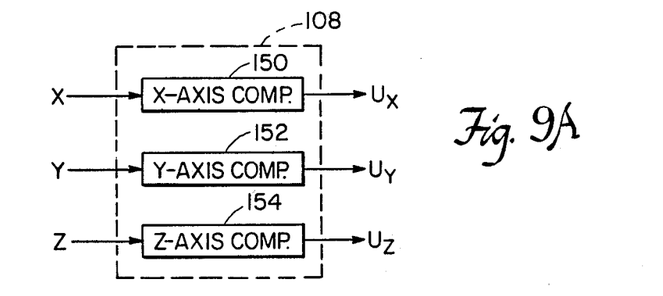
FIG. 9 is a schematic block diagram of the translation compensation circuit of FIG. 6A.

Translational compensation circuit 108, FIG. 9A, contains X-axis compensation circuit 150 which processes displacement signal X to provide force correction command $U_X$. Similarly, Y-axis compensation circuit 152 and Z-axis compensation circuit 154 receive displacement signals Y and Z and provide force correction commands $U_Y$ and $U_Z$.

Figure 9B:
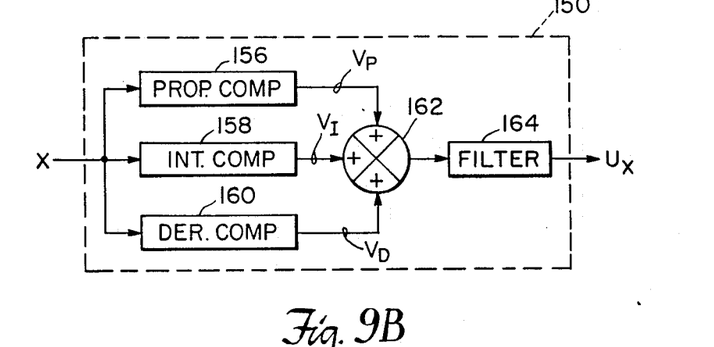
FIG. 9B is a more detailed schematic of an X-axis compensation circuit of FIG. 9A.

X-axis compensation circuit 150 is shown in greater detail in FIG. 9B where displacement signal X is provided simultaneously to proportional compensation circuit 156, integrating compensation circuit 158, and derivative compensation circuit 160. These circuits modify signal X, termed $V_{in}$, according to the formulas:

$$V_p = K_p V_{in} \quad (1)$$

$$V_I = K_I \int V_{in} dt \quad (2)$$

$$V_D = K_D \quad (3)$$

respectively, where $K_P$, $K_I$, and $K_D$ are three respective constants and t is time. The three outputs from these circuits are combined by summer 162 and processed by low pass filter 164.

Figure 10A:
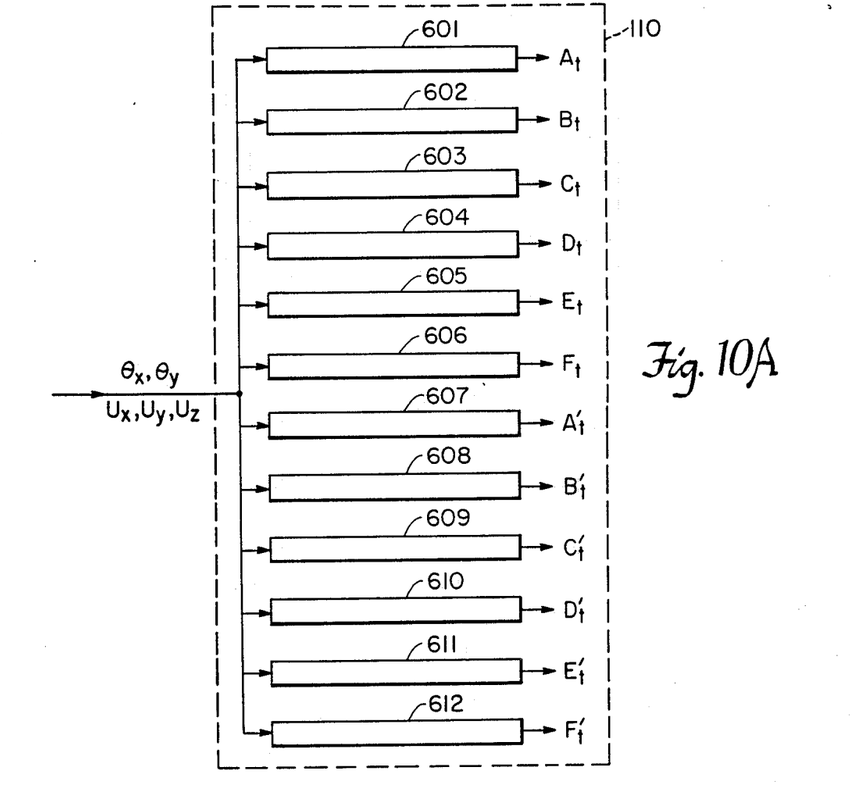
FIGS. 10A and 10B are schematics of the coil excitation translational circuit of FIG. 6A.
Figure 10B:
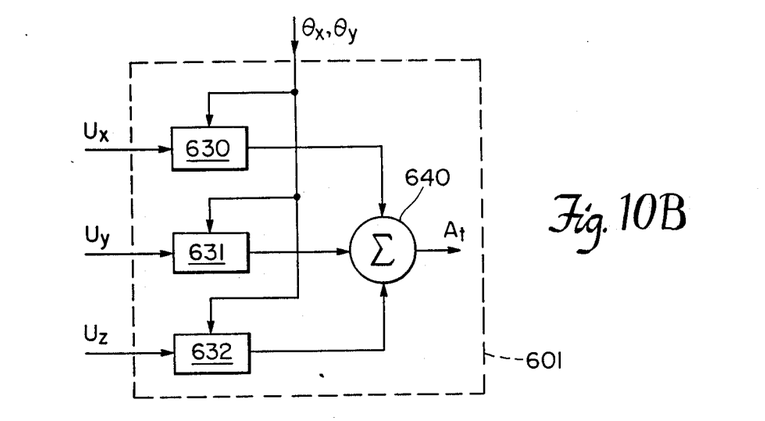

Coil excitation logic circuit 110 for processing force correction commands provides twelve coil correction commands, $A_{t'}$......$F_{t'}$, FIG. 10A. Excitation distribution circuits 601–612 process $U_x$, $U_y$, $U_z$ and $\theta_x$ and $\theta_y$ to provide coil correction commands $A_t$....$F_{t'}$. For example, excitation distribution circuit 601, FIG. 10B, includes variable gain amplifiers 630–632 responsive to $U_x$, $U_y$ and $U_z$ and $\theta_x$ and $\theta_y$ from rotor angle determining circuit 116, FIG. 6B. Amplifier 630, for example, multiplies Ux by a value which is a preset function of $\theta_x$ and $\theta_y$. The amplified signals are combined in summer 640 to produce coil correction command $A_t$.

The rotation signals are processed in a similar fashion. Sensor signal conditioning circuit 114, FIG. 6B, contains signal normalizing circuits equivalent to those shown in FIGS. 7A and 7B.

Figure 11:
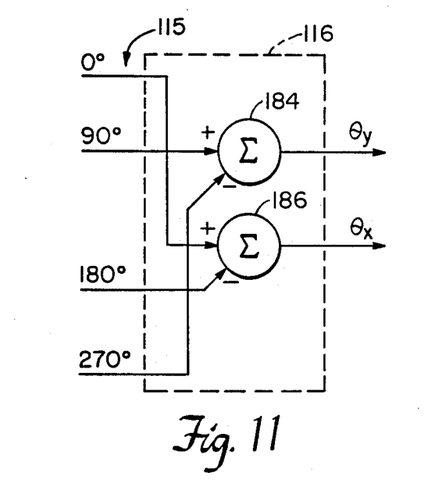
FIG. 11 is a schematic of the rotor angle determining circuit of FIG. 6B.

Rotor angle determining circuit 116, FIG. 11, combines normalized sensor signals 115 at 90 degrees and 270 degrees in summer 184 to provide rotor angle signal $\theta_y$. Normalized signals at 0 degrees and 180 degrees are combined in summer circuit 186 as illustrated to provide rotor angle signal $\theta_x$.

Figure 12:
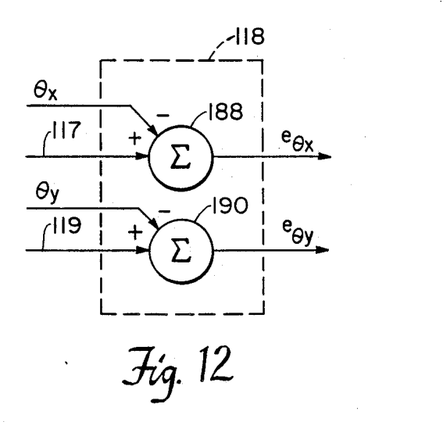
FIG. 12 is a schematic of the summing circuit of FIG. 6B.

Summer circuit 118, FIG. 12, contains summers 188 and 190 for negatively combining rotor angle $\theta_x$ and rotor angle $\theta_y$ with rotor angle set point commands 117, 119 for those angles. Rotor angle error signals $e_x$ and $e_y$ are thereby produced.

Figure 6B:
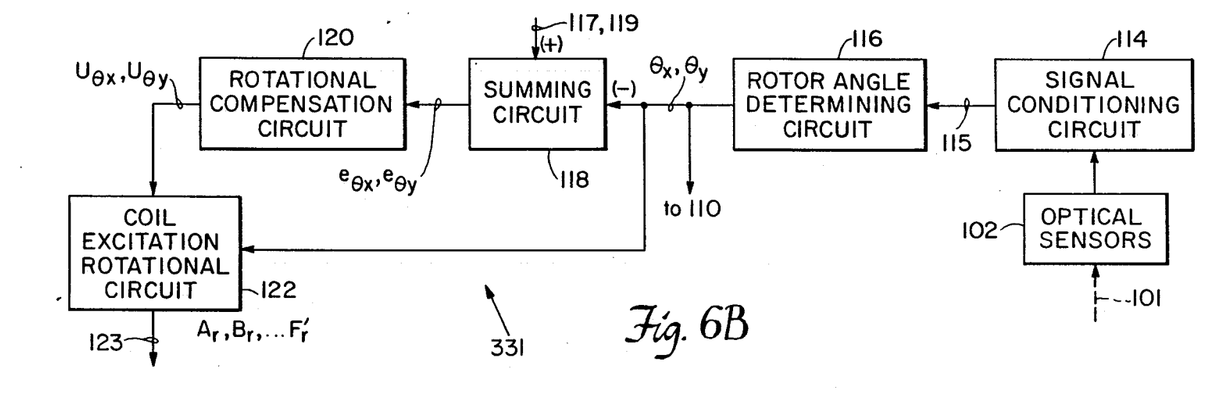
Figure 13A:
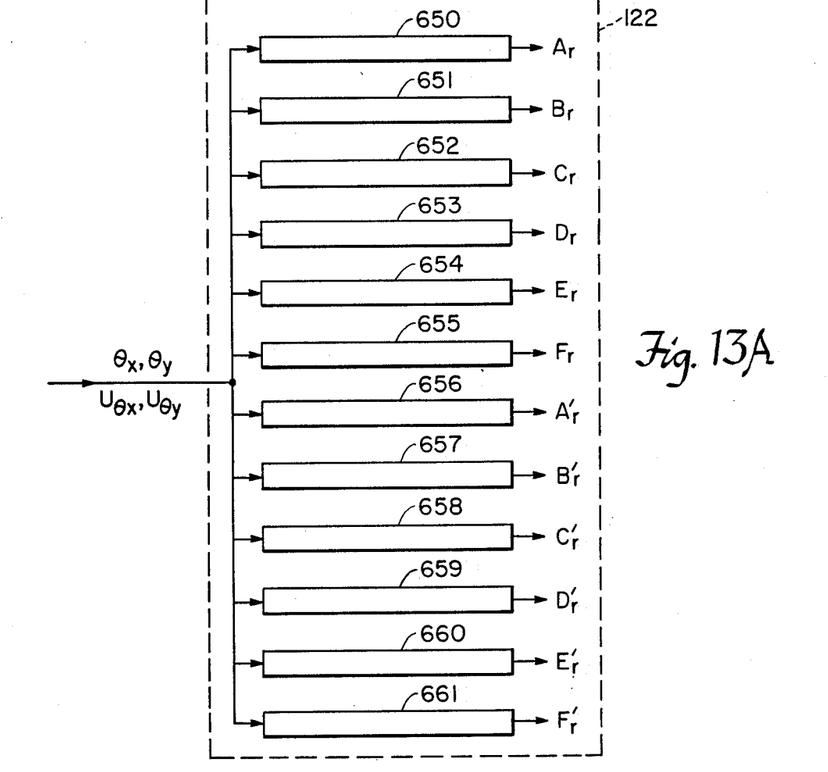
FIGS. 13A and 13B are schematics of the coil excitation rotational circuit of FIG. 6B.
Figure 13B:
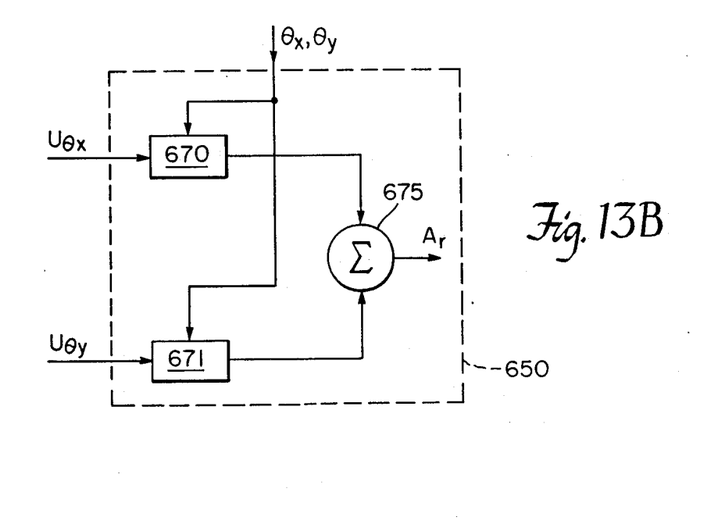

Rotational compensation circuit 120, FIG. 6B, includes two compensation circuits for processing rotor angle error signals $e\theta_x$ and $e\theta_y$ respectively, into torque correction commands $U\theta_x$ and $U\theta_y$. The compensation circuits are equivalent to those shown in FIGS. 9A and 9B. Coil excitation logic circuit 122 distributes torque correction commands $U\theta_x$ and $U\theta_y$ into twelve coil correction commands, FIG. 13A. Circuit 122 includes 12 excitation distribution circuits 650–661. For example, excitation distribution circuit 650, FIG. 13B, includes variable gain amplifiers 670 and 671. Amplifier 670, for example, multiplies $U\theta_x$ by a value which is a preset function of $\theta_x$ and $\theta_y$. The amplified signals are combined in summer 675 to produce coil correction command $A_r$.

Figure 14:
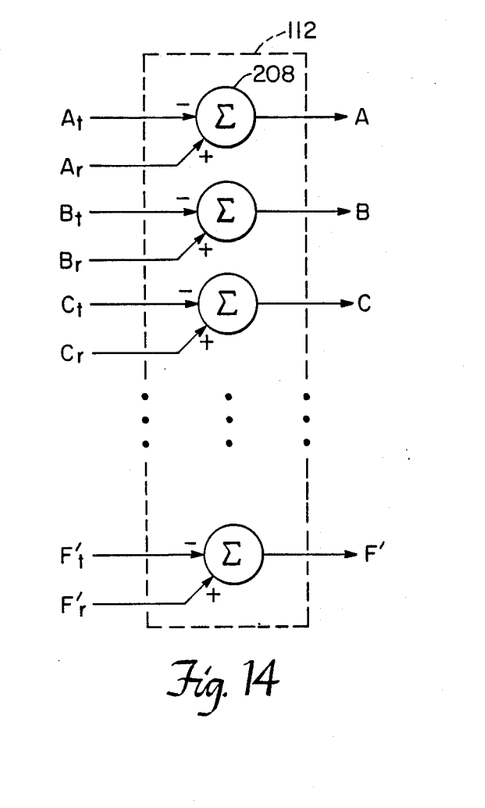
FIG. 14 is a schematic of the summing circuit of FIG. 6A.

Summing circuit 112, FIG. 14, combines the inverse of each of the twelve translational coil correction commands $A_{t'}$,...$F_{t'}$ with the corresponding rotational coil correction command; the rotational corrective commands were inverted by summing circuit 118, FIG. 6B. Translational coil correction command $A_t$ is combined with rotational coil correction command $A_r$ at summer 208, FIG. 14, for example. A single coil correction command such as command A is then provided to each of the twelve coils as described above.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A magnetic gyroscope system comprising:
   a rotor including a magnetic member having a spin axis and a flywheel fixed to said member having a spherical contour, said magnetic member including a superconducting
   an armature for inducing rotation of said rotor to store angular momentum;
   a generally spherical housing spaced from said rotor;
   means attached to said housing for applying a magnetic field to said rotor to fix its lateral position relative to said housing;
   means attached to said housing for applying a magnetic field to said rotor to fix its axial position relative to said housing;
   means attached to said housing for applying a magnetic field to said rotor to adjust the angular orientation of the spin axis of the rotor relative to said housing for transferring momentum between the housing and rotor to control the relative positions of the housing and the rotor.

2. The magnetic gyroscope system of claim 1 in which said means for applying a magnetic field to said rotor to fix its lateral position includes at least on control coil for conducting current flow to create the magnetic field.

3. The magnetic gyroscope system of claim 2 in which said means for applying a magnetic field to said rotor to fix its lateral position includes a first pair of control coils and means for selectively exciting the coils for maintaining the lateral position of said rotor in a first radial direction.

4. The magnetic gyroscope system of claim 3 in which said means for applying a magnetic field to said rotor to fix its lateral position further includes a second pair of control coils and means for selectively exciting the coils for maintaining the lateral position of said rotor in a second radial direction perpendicular to said first radial direction.

5. The magnetic gyroscope system of claim 1 in which said means for applying magnetic field to said rotor to fix its axial position includes at least one control coil for conducting current flow to create the magnetic field.

6. The magnetic gyroscope system of claim 5 in which said means for applying a magnetic field to said rotor to fix its axial position includes at least one pair of control coils and means for selectively exciting the coils for maintaining the axial position of the rotor.

7. The magnetic gyroscope system of claim 1 in which said means for applying a magnetic field to said rotor to adjust the angular orientation of the spin axis of the rotor includes at least one control coil for conducting current flow to create the magnetic field.

8. The magnetic gyroscope system of claim 5 in which said means for applying a magnetic field to said rotor to adjust the angular orientation of the spin axis of the rotor further includes means for determining the relative positions of the spin axis of the rotor and the housing.

9. The magnetic gyroscope system of claim 8 in which said means for applying a magnetic field to said rotor to adjust the angular orientation of its spin axis further includes means, responsive to said means for determining, for selectively exciting said control coils to alter the relative position of the spin axis and the housing.

10. The magnetic gyroscope system of claim 1 further including means for monitoring the lateral and axial position of the rotor relative to the housing.

11. The magnetic gyroscope system of claim 10 in which said means for applying a magnetic field to said rotor to fix its axial position and fix its lateral position are responsive to said means for monitoring for maintaining the lateral and axial position of the rotor relative to the housing.

12. The magnetic gyroscope system of claim 1 in which said armature is fixed to said housing.

13. The magnetic gyroscope system of claim 1 in which said armature is outside of said housing.

14. The magnetic gyroscope system of claim 1 in which said housing surrounds said rotor.

15. A magnetic rotor suspension system comprising:
a magnetic rotor having a spin axis, said rotor including an annular electromagnetic coil and being adapted for connection to a rotating member;
a generally spherical housing spaced from said rotor;
means attached to said housing for applying a magnetic field to said rotor to fix its lateral position relative to said housing;
means attached to said housing for applying a magnetic field to said rotor to fix its axial position relative to said housing; and
means attached to said housing for applying a magnetic field to said rotor to adjust the angular orientation of the spin axis of the rotor relative to said housing.

16. The magnetic rotor suspension system of claim 15 in which said rotor includes a superconducting solenoid.

17. A magnetic bearing system comprising:
a magnetic rotor having a spin axis, said rotor including an annular electromagnetic coil and being adapted for connection to a rotation member;
a generally spherical housing spaced from said rotor;
means attached to said housing for applying a magnetic field to said rotor to fix its lateral position relative to said housing;
means attached to said housing for applying a magnetic field to said rotor to fix its axial position relative to said housing; and
means attached to said housing for applying a magnetic field to said rotor to fix the angular orientation of the spin axis of the rotor relative to said housing.

18. The magnetic bearing system of claim 17 in which said rotor includes a superconducting solenoid.

19. A superconducting magnetic rotor suspension system comprising:
a rotor including a superconducting magnetic solenoid having a spin axis, said rotor being adapted for connecting to a rotating member;
a housing spaced from said rotor;
means attached to said housing for applying a magnetic field to said rotor to fix its lateral position relative to said housing;
means attached to said housing for applying a magnetic field to said rotor to fix its axial position relative to said housing; and
means attached to said housing for applying a magnetic field to said rotor to adjust the angular orientation of the spin axis of the rotor relative to said housing.

20. A superconducting magnetic bearing system comprising:
a rotor including a superconducting magnetic solenoid having a spin axis, said rotor being adapted for connection to a rotating member;
a housing spaced from said rotor;
means attached to said housing for applying a magnetic field to said rotor to fix its lateral position relative to said housing;
means attached to said housing for applying a magnetic field to said rotor to fix its axial position relative to said housing; and
means attached to said housing for applying a magnetic field to said rotor to fix the angular orientation of the spin axis of the rotor relative to said housing.

21. A superconducting magnetic gyroscope system comprising:
a rotor including a superconducting magnetic solenoid having a spin axis and a flywheel fixed to said solenoid;
means for maintaining said solenoid at no greater than its superconducting critical temperature;
a housing surrounding and spaced from said rotor;
an armature fixed to said housing for inducing rotation of said rotor to store angular momentum;
a plurality of pairs of coils attached to said housing for conducting current flow to apply magnetic field to said rotor to fix its lateral and axial position relative to said housing and adjust the angular orientation of the spin axis of the rotor relative to said housing;
means for monitoring the lateral and axial position of the rotor relative to the housing and the relative positions of the spin axis of the rotor and the housing; and
means, responsive to said means for monitoring, for selectively exciting said pairs of coils to maintain the lateral and axial position of the rotor relative to the housing and adjust the angular orientation of the spin axis of the rotor relative to the housing for transferring momentum between the housing and rotor to control the relative positions of the housing and the rotor.

22. A magnetic gyroscope system comprising:

a rotor including a magnetic member having a spin axis and a flywheel having a spherical contour fixed to said member;

a generally spherical housing spaced from said rotor;

an armature outside said housing for inducing rotation of said rotor to store angular momentum;

means attached to said housing for applying a magnetic field to said rotor to fix its lateral position relative to said housing;

means attached to said housing for applying a magnetic field to said rotor to fix its axial position relative to said housing; and means attached to said housing for applying a magnetic field to said rotor to adjust the angular orientation of the spin axis of the rotor relative to said housing for transferring momentum between the housing and rotor to control the relative positions of the housing and the rotor.

23. A magnetic gyroscope system comprising:

a rotor including a magnetic member, said magnetic member including an annular electromagnetic coil having a spin axis, and a flywheel having a spherical contour fixed to said member;

an armature for inducing rotation of said rotor to store angular momentum;

a generally spherical housing spaced from said rotor;

means attached to said housing for applying a magnetic field to said rotor to fix its lateral position relative to said housing;

means attached to said housing for applying a magnetic field to said rotor to fix its axial position relative to said housing; and means attached to said housing for applying a magnetic field to said rotor to adjust the angular orientation of the spin axis of the rotor relative to said housing for transferring momentum between the housing and rotor to control the relative positions of the housing and the rotor.

24. The magnetic gyroscope system of claim 23 wherein said annular electromagnetic coil is a superconducting solenoid.

25. The magnetic gyroscope system of claim 24 further including means for maintaining said solenoid at no greater than its superconducting critical temperature.

* * * * *